(12) United States Patent
Drinkwater et al.

(10) Patent No.: US 10,007,116 B2
(45) Date of Patent: Jun. 26, 2018

(54) RECESSED LIGHT-EMITTING DIODES IN VIRTUAL-REALITY SYSTEMS

(71) Applicant: Facebook, Inc., Menlo Park, CA (US)

(72) Inventors: Jared I. Drinkwater, Auburn, WA (US); Mark Alan Tempel, Sammamish, WA (US); Robin Michael Miller, Redmond, WA (US); Peter Wesley Bristol, Seattle, WA (US); Boyd Drew Allin, Seattle, WA (US); Joseph Patrick Sullivan, Seattle, WA (US); Yi-yaun Chen, Seattle, WA (US)

(73) Assignee: OCULUS VR, LLC, Menlo Park, CA (US)

( * ) Notice: Subject to any disclaimer, the term of this patent is extended or adjusted under 35 U.S.C. 154(b) by 56 days.

(21) Appl. No.: 14/843,862

(22) Filed: Sep. 2, 2015

(65) Prior Publication Data

US 2016/0363768 A1    Dec. 15, 2016

Related U.S. Application Data

(60) Provisional application No. 62/175,992, filed on Jun. 15, 2015.

(51) Int. Cl.
| | |
|---|---|
| *G02B 27/01* | (2006.01) |
| *G02B 27/00* | (2006.01) |
| *G06F 3/01* | (2006.01) |
| *A63F 13/00* | (2014.01) |
| *G06F 1/16* | (2006.01) |
| *G06F 3/03* | (2006.01) |
| *G06F 3/0346* | (2013.01) |

(52) U.S. Cl.
CPC .......... *G02B 27/0172* (2013.01); *A63F 13/00* (2013.01); *G02B 27/0093* (2013.01); *G06F 1/163* (2013.01); *G06F 3/011* (2013.01); *G06F 3/012* (2013.01); *G06F 3/0325* (2013.01); *G06F 3/0346* (2013.01); *G02B 2027/0138* (2013.01)

(58) Field of Classification Search
CPC combination set(s) only.
See application file for complete search history.

(56) References Cited

U.S. PATENT DOCUMENTS

| | | | | |
|---|---|---|---|---|
| 2007/0065638 | A1* | 3/2007 | Wang | G02B 1/105 428/141 |
| 2015/0298363 | A1* | 10/2015 | Kamiyama | B29C 37/0053 65/66 |
| 2016/0187657 | A1* | 6/2016 | Thomas | G02B 27/0176 345/633 |
| 2016/0187974 | A1* | 6/2016 | Mallinson | G06F 3/014 463/32 |

* cited by examiner

*Primary Examiner* — Jennifer Mehmood
*Assistant Examiner* — Deeprose Subedi
(74) *Attorney, Agent, or Firm* — Morgan, Lewis & Bockius LLP

(57) ABSTRACT

A head-mounted display for a virtual-reality system includes one or more outer surfaces having a plurality of recesses. Light-emitting diodes (LEDs) are installed in respective recesses of the plurality of recesses. The recesses are covered with covers that are substantially flush with respective surfaces of the one or more outer surfaces of the head-mounted display.

18 Claims, 4 Drawing Sheets

RECESSED LIGHT-EMITTING DIODES IN VIRTUAL-REALITY SYSTEMS

RELATED APPLICATIONS

This application claims priority to U.S. Provisional Patent Application Ser. No. 62/175,992, filed Jun. 15, 2015, entitled "Recessed Light-Emitting Diodes in Virtual-Reality Systems," which application is incorporated by reference in its entirety.

TECHNICAL FIELD

This application relates generally to wearable technology and virtual-reality technology, including but not limited to a head-mounted display with recessed light-emitting diodes (LEDs).

BACKGROUND

Virtual-reality head-mounted displays have wide applications in various fields, including engineering design, medical surgery practice, military simulated practice, and video gaming. For example, a user wears a virtual-reality head-mounted display integrated with audio headphones while playing video games so that the user can have an interactive experience in an immersive virtual environment.

SUMMARY

In some embodiments, a method of making a head-mounted display includes forming recesses in one or more outer surfaces of the head-mounted display, installing light-emitting diodes (LEDs) in the recesses, and covering the recesses with covers that are substantially flush with respective surfaces of the one or more outer surfaces of the head-mounted display.

In some embodiments, a head-mounted display includes one or more outer surfaces having a plurality of recesses. LEDs are installed in respective recesses of the plurality of recesses. The recesses are covered with covers that are substantially flush with respective surfaces of the one or more outer surfaces of the head-mounted display.

Various advantages of the present application are apparent in light of the descriptions below.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first segment could be termed a second segment, and, similarly, a second segment could be termed a first segment, without departing from the scope of the various described embodiments. The first segment and the second segment are both segments, but they are not the same segment.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
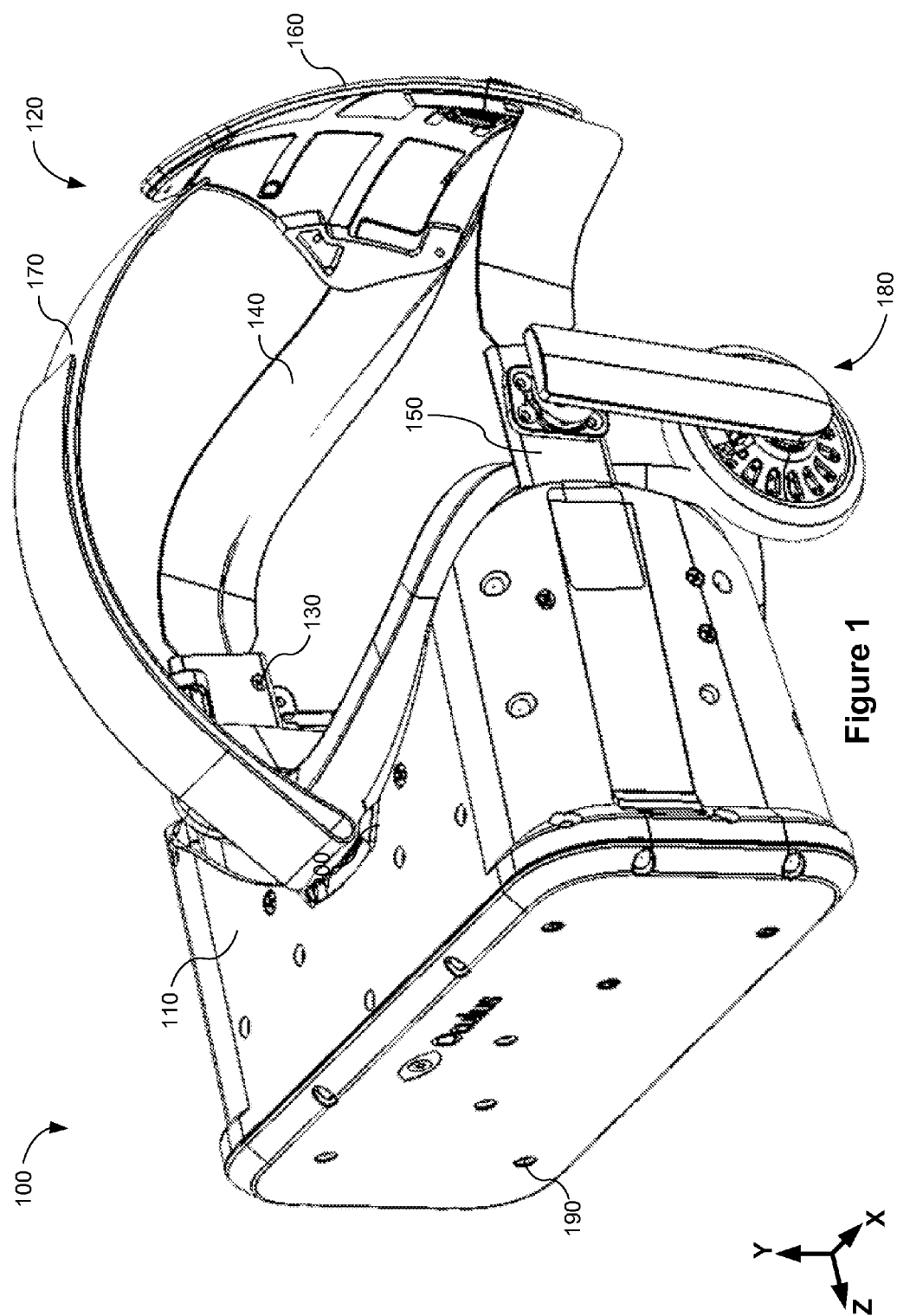
FIG. 1 is a perspective view of a head-mounted display system in accordance with some embodiments.

FIG. 1 is a perspective view of a head-mounted display system 100 in accordance with some embodiments. In some embodiments, the head-mounted display system 100 includes a head-mounted display (HMD) 110, a strap system 120, and a detachable audio subsystem 180. Although not shown due to the perspective, the head-mounted system 100 may have two audio subsystems located on left and right sides to provide audio signals to the user's left and right ears. Each of the left and right audio subsystems may use substantially symmetric structures for coupling the speaker to a corresponding rigid segment of the strap system 120.

The strap system 120 is used for mounting the head-mounted display 110 on a user's head. In the example of FIG. 1, the strap 120 includes a rigid segment 130, a semi-rigid segment 140, and a rigid segment 150 that are coupled to each other to adjustably wrap around side and back portions of the user's head.

In some embodiments, the strap 120 includes a single and continuous semi-rigid segment 140 including two arc portions, and each arc portion is to extend from above a user's ears to below the user's occipital lobe to conform to a portion of the user's head. Alternatively, the strap 120 may include two separate and symmetric semi-rigid segments each including an arc portion.

In some embodiments, the rigid segments 130 and 150 are respectively connected to the semi-rigid segment 140. The rigid segments 130 and 150 are also respectively coupled to the head-mounted display 110 and positioned on respective sides of the user's head to extend along the lateral dimension (e.g., the Z dimension in FIG. 1). The strap 120 may further include flexible segments (not shown) that are stretchable within the rigid segments 130 and 150 respectively to adjust the strap 120 in accordance with the user's head.

In some embodiments, the strap 120 includes a back piece 160 coupled with the semi-rigid segment 140 to rest against the back of the user's head (e.g., around the user's occipital lobe). For example as shown in FIG. 1, the back piece 160 has a triangular shape. While the back piece 160 is shown without openings, in some embodiments the back piece has a hollow and triangular center. The semi-rigid piece 140 extends to wrap around a portion at the back of the user' head (e.g., around the user's occipital lobe). The semi-rigid piece 140 includes a portion that conforms to the shape of the back piece 160 and the back piece 160 is coupled to the portion of the semi-rigid piece 140 at the back of the user's head.

In some embodiments, the strap 120 includes a top strap 170 coupled to the back piece 160 (or the semi-rigid segment 140) and the head-mounted display 110 to adjustably conform to the top of the user's head when the user is wearing the head-mounted display.

In some embodiments, various electrical connection mechanisms (e.g., flat flexible circuits and/or electric cables) are used in the head-mounted display system 100 to provide power management, signal transmission, and/or other functionalities to the head-mounted display 110 and the detachable audio subsystem 180. For example, the head-mounted display 110 is integrated with the detachable audio subsystem 180 using suitable electrical connection mechanisms to provide both visual and audio virtual-reality experiences to the user.

Various embodiments of the strap system 120 and the head-mounted display system 100 are described in U.S. patent application Ser. No. 14/603,335, filed on Jan. 22, 2015, and U.S. patent application Ser. No. 14/681,001, filed on Apr. 7, 2015, the disclosures of which are incorporated herein by reference in their entireties.

Various embodiments of the detachable audio subsystem 180 and coupling mechanisms between the detachable audio subsystem 180 and the head-mounted display system 100 are described in U.S. patent application Ser. No. 14/627,639, filed on Feb. 20, 2015, U.S. Provisional Patent Application No. 62/174,298, filed on Jun. 11, 2015, and U.S. Provisional Patent Application No. 62/174,359, filed on Jun. 11, 2015, the disclosures of which are incorporated herein by reference in their entireties.

A plurality of infrared (IR) LEDs 190 is distributed on outer surfaces (e.g., front, top, bottom, left-side, and/or right-side surfaces) of the head-mounted display 110. In some embodiments, the LEDs 190 are infrared (IR) LEDs. In conjunction with an external camera (e.g., which is positioned facing the user wearing the head-mounted display 110), the LEDs 190 are used for sensing motions of the user's head. The external camera captures a sequence of images of the head-mounted display 110. Variation in positions of the LEDs 190 over time is used to determine movement of the head-mounted display 110, based on which motion of an image subject is modeled in virtual reality in accordance with actual physical head motions made by the user. Virtual-reality images are generated and presented to the user accordingly. The head-mounted display 110 is thus configured to display a view which shifts as a user shifts their head in some direction or tilts their head at an angle. In some embodiments, flexible circuits provide power management and transmit electrical signals among different components (e.g., display screens, LEDs 190, and detachable audio system 180) of the head-mounted display system 100.

Figure 2A:
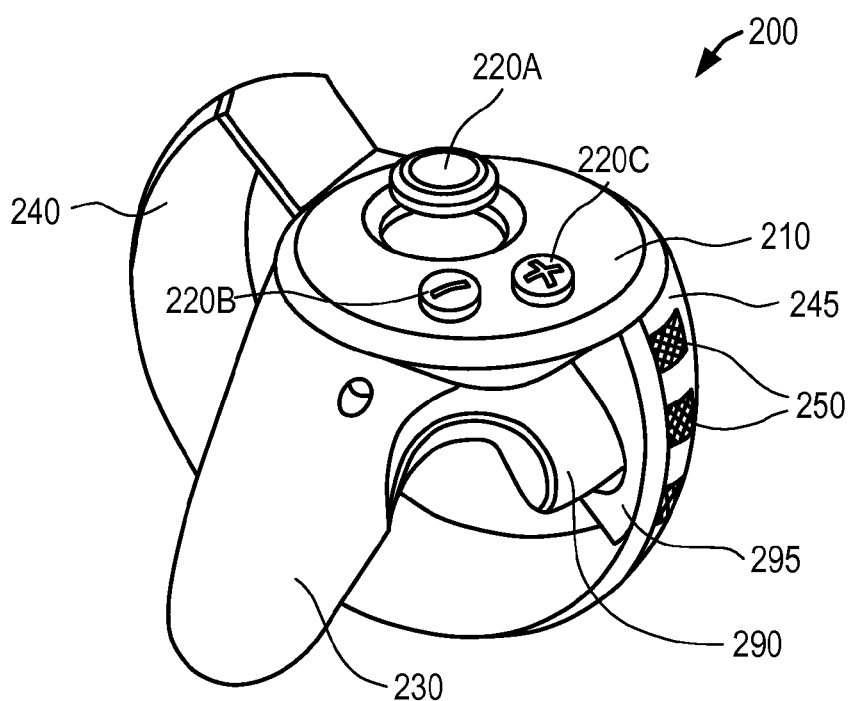
FIGS. 2A and 2B illustrate isometric views of a hand-held controller used in the virtual-reality system in accordance with some embodiments.
Figure 2B:
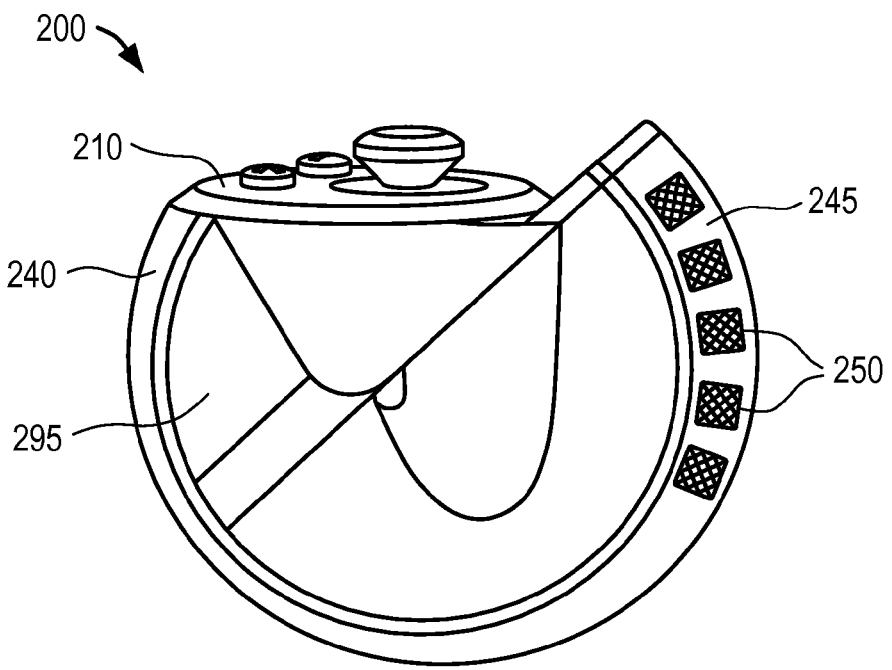
Figure 3A:
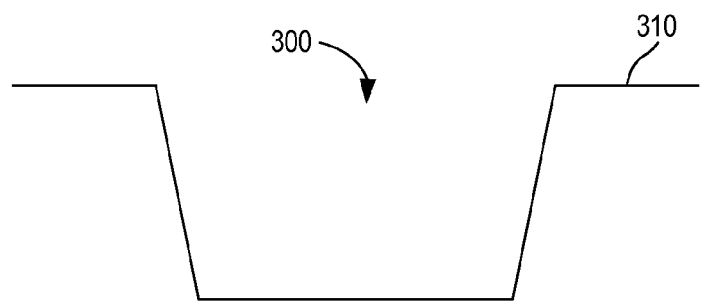
FIGS. 3A-3D are cross-sectional illustrations of a recess in the surface of a head-mounted display in which an LED is installed, in accordance with some embodiments.
Figure 3B:
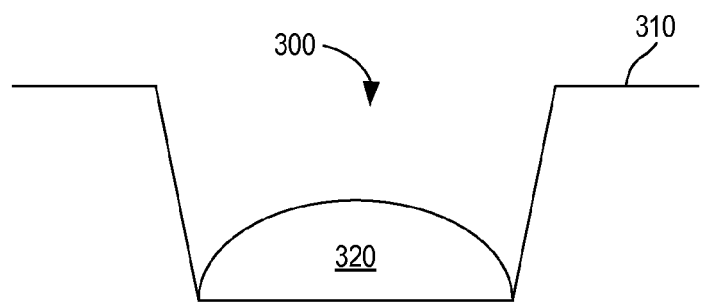
Figure 3C:
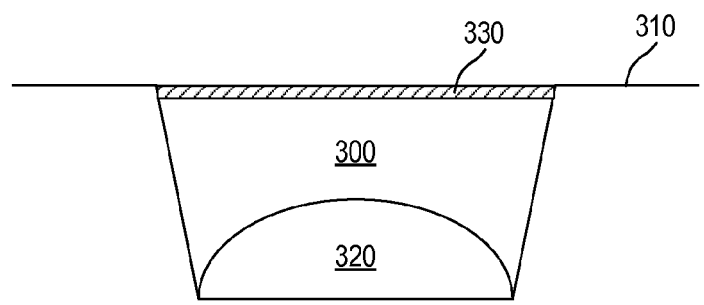
Figure 3D:
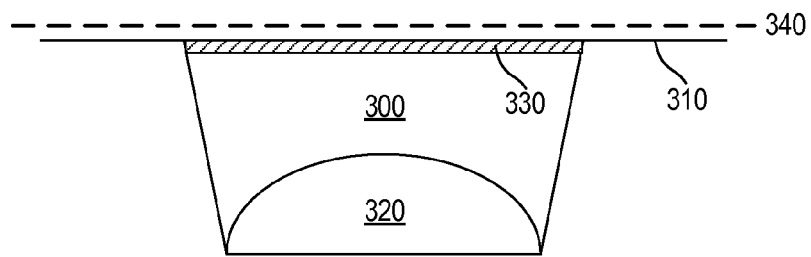

FIGS. 2A and 2B illustrate isometric views of a hand-held controller 200 used in the virtual-reality system 100 in accordance with some embodiments. The hand-held controller 200 includes user-input keys 220A, 220B, and 220C; a grip 230; a cage 240 coupled to the grip 230 and having an outward-facing surface 245; a trigger 290 mounted at least partially on the grip 230; and a plurality of LEDs 250 coupled to (e.g., mounted on or embedded in) the outward-facing surface 245. The LEDs 250 are configured to emit light that is detectable by a remote camera (e.g., the external camera used to track movement of the head-mounted display 110, or a camera mounted on the head-mounted display 110). The remote camera is positioned to detect movement in positions of the LEDs 250 when the user makes a motion (e.g., waving, swinging, punching, shaking, or any other hand motion) while holding the grip 230 of the controller. By detecting a movement of the LEDs 250 on the controller 200, the camera is able to capture sequential positions of the controller 200 over time, and thus allow motion of an image subject to be modeled in virtual reality based on actual physical motions made by the user (e.g., punching, swinging, etc).

The LEDs 250 are positioned on the outward-facing surface 245 of the cage 240 in any suitable pattern, order, or array. Although the LEDs are described as being positioned on the outer 245 surface of the cage 240, they may additionally or alternatively be coupled to any other surface on the cage 240 and/or the rest of the controller 200.

A user-input key is a button, knob, switch, thumbstick, directional pad, or any other such part that a user presses or manipulates in some other way to carry out a specific action in a virtual-reality system (e.g., during gaming). In the example of FIG. 2A, the user-input keys include a thumbstick 220A and buttons 220B as well as the trigger 290. The thumbstick 220A and buttons 220B are situated on a user-input surface 210. In other examples hand-held controllers may have different configurations of user-input keys.

Attention is now directed to the fabrication of virtual-reality-system components that have LEDs.

Figure 4:
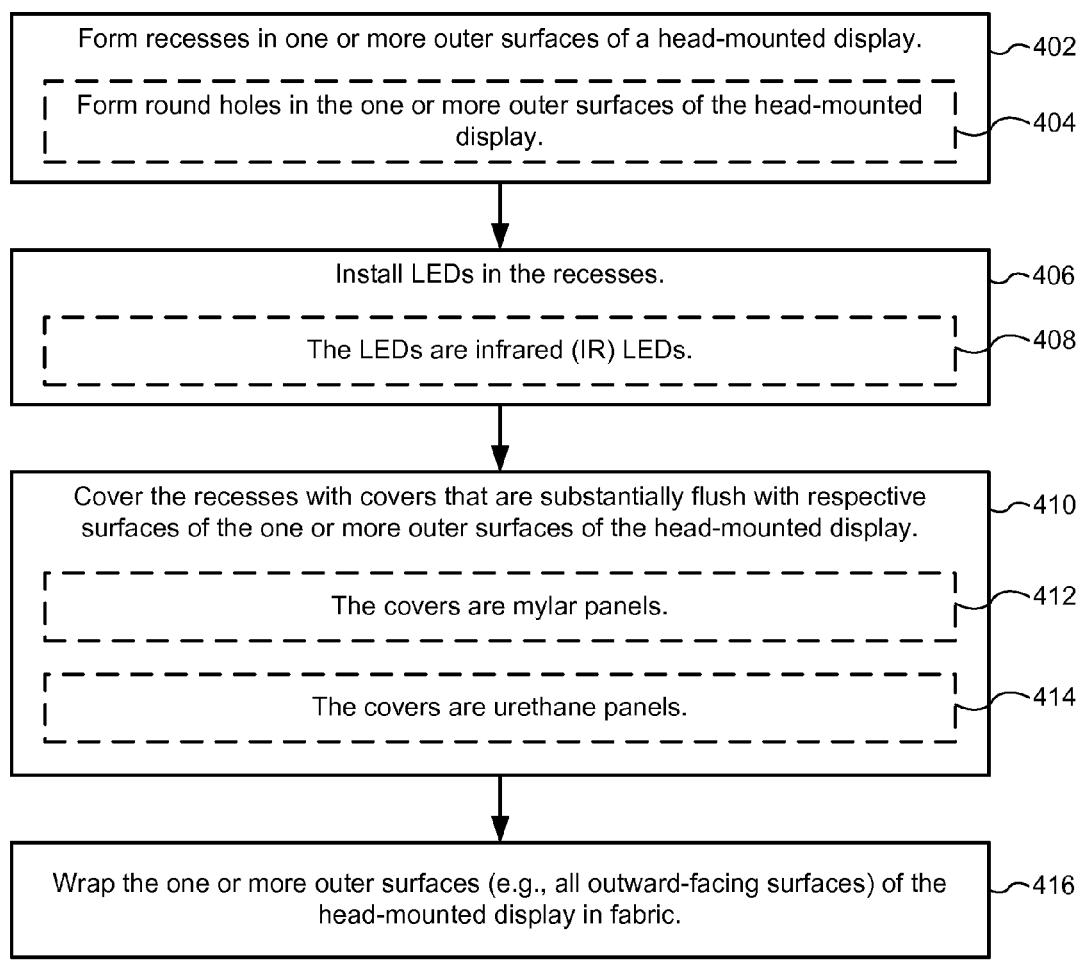
FIG. 4 is a flowchart showing a method of installing LEDs in a head-mounted display of a virtual-reality system in accordance with some embodiments.

FIG. 4 is a flowchart showing a method 400 of installing LEDs (e.g., LEDs 190, FIG. 1) in a head-mounted display (e.g., head-mounted display 110, FIG. 1) of a virtual-reality system in accordance with some embodiments. The method 400 is described with reference to FIGS. 3A-3D, which are cross-sectional illustrations of a recess 300 in the surface of a head-mounted display in which an LED is installed, in accordance with some embodiments. In some embodiments, an analogous method is performed to install LEDs (e.g., LEDs 250, FIGS. 2A-2B) in a hand-held controller (e.g., hand-held controller, FIGS. 2A-2B) of a virtual-reality system and/or a back piece (e.g., back piece 160, FIG. 1) of a strap system.

In the method 400, recesses 300 (FIG. 3A) are formed (402) in one or more outer surfaces 310 of a head-mounted display. For example, round holes are formed (404).

LEDs 320 (FIG. 3B) are installed (406) in the recesses 300. In some embodiments, the LEDs 320 are examples of LEDs 190 (FIG. 1). In some embodiments, the LEDs 320 are (408) infrared (IR) LEDs. In some embodiments, there are openings in the bottoms and/or sides of the recesses 300 through which electrical connection is made to the LEDs 320. The LEDs 320 thus are connected to circuitry within the head-mounted display.

The recesses 300 are covered (410) with covers 330 (FIG. 3C) that are substantially flush with respective surfaces of the one or more outer surfaces 310 of the head-mounted display. For example, the covers 330 appear to the eye to be flush with the respective surfaces and/or feel flush with the respective surfaces to the touch. In another example, the covers 330 are flush with the respective surfaces to within manufacturing tolerances.

In some embodiments, the covers 330 are made of a transparent material. For example, the covers 330 are (414) urethane panels.

In some embodiments, the covers 330 are (412) mylar panels. While mylar is not considered a transparent material, the covers 330 are sufficiently thin to allow a detectable level of light to be emitted from the recesses 300 with the LEDs 320 are turned on. The mylar panels are thus effectively transparent. The covers 330 thus may be sufficiently thin to allow a detectable level of light to be emitted from the recesses 300, even if made of a material that is not considered transparent.

In some embodiments, the one or more outer surfaces (e.g., all outward-facing surfaces) of the head-mounted display are wrapped (416) in fabric 340. In some embodiments, the LEDs are IR LEDs and the fabric is opaque at wavelengths that are visible to the away but is transparent to the IR light emitted by the LEDs.

The method 400 allows a head-mounted display (or other component of a virtual-reality system) to be fabricated with LEDs that can be used for motion tracking. The use of flush covers on the recesses results in smooth surfaces that have a clean look. The method 400 also allows the recesses to be covered with performing over-molding, which may be impractical for the dimensions in question.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
    forming recesses in one or more outer surfaces of a head-mounted display;
    after forming the recesses, installing light-emitting diodes (LEDs) in the recesses; and
    covering the recesses with a plurality of covers that are distinct from and substantially flush with respective surfaces of the one or more outer surfaces of the head-mounted display, each cover of the plurality of covers covering a respective recess of the recesses.

2. The method of claim 1, wherein forming the recesses comprises forming round holes in the one or more outer surfaces of the head-mounted display.

3. The method of claim 1, wherein covering the recesses comprises placing polyester films of stretched polyethylene terephthalate over the recesses, wherein the polyester films as placed over the recesses are flush with the respective surfaces of the one or more outer surfaces of the head-mounted display.

4. The method of claim 1, wherein covering the recesses comprises placing urethane panels over the recesses, wherein the urethane panels as placed over the recesses are flush with the respective surfaces of the one or more outer surfaces of the head-mounted display.

5. The method of claim 1, wherein the covers are transparent.

6. The method of claim 1, wherein the covers comprise nontransparent material of sufficient thinness to allow a detectable level of light to be emitted from the recesses when the LEDs are turned on.

7. The method of claim 1, wherein the LEDs comprise infrared LEDs.

8. The method of claim 1, further comprising:
    after covering the recesses, wrapping the one or more outer surfaces of the head-mounted display in fabric.

9. The method of claim 8, wherein:
    the LEDs comprise infrared LEDs; and
    the fabric is opaque at visible wavelengths and transparent to infrared light emitted by the LEDs.

10. A head-mounted display, comprising:
    one or more outer surfaces having a plurality of recesses;
    light-emitting diodes (LEDs) installed in respective recesses of the plurality of recesses; and
    a plurality of covers covering the respective recesses, each cover of the plurality of covers covering a respective recess of the plurality of recesses, wherein the covers are distinct from and substantially flush with respective surfaces of the one or more outer surfaces of the head-mounted display.

11. The head-mounted display of claim 10, wherein the recesses comprise round holes in the one or more outer surfaces of the head-mounted display.

12. The head-mounted display of claim 10, wherein the covers comprise polyester films of stretched polyethylene terephthalate.

13. The head-mounted display of claim 10, wherein the covers comprise urethane panels.

14. The head-mounted display of claim 10, wherein the covers are transparent.

15. The head-mounted display of claim 10, wherein the covers comprise nontransparent material of sufficient thinness to allow a detectable level of light to be emitted from the recesses when the LEDs are turned on.

16. The head-mounted display of claim 10, wherein the LEDs comprise infrared LEDs.

17. The head-mounted display of claim 10, further comprising fabric covering the one or more outer surfaces of the head-mounted display.

18. The head-mounted display of claim 17, wherein:
    the LEDs comprise infrared LEDs; and
    the fabric is opaque at visible wavelengths and transparent to infrared light emitted by the LEDs.

* * * * *